(12) United States Patent
Wang et al.

(10) Patent No.: US 9,217,456 B2
(45) Date of Patent: Dec. 22, 2015

(54) WATERPROOF, DUSTPROOF, BREATHING BOLT

(71) Applicant: Chicony Power Technology Co., Ltd., New Taipei (TW)

(72) Inventors: Ying-Hsiang Wang, New Taipei (TW); Yu-Jen Lai, New Taipei (TW); Ming-Yen Hsu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 64 days.

(21) Appl. No.: 13/914,975

(22) Filed: Jun. 11, 2013

(65) Prior Publication Data

US 2014/0363256 A1 Dec. 11, 2014

(51) Int. Cl.
*F16B 35/06* (2006.01)
*F16B 33/00* (2006.01)
*E04D 13/17* (2006.01)

(52) U.S. Cl.
CPC ............. *F16B 35/06* (2013.01); *F16B 33/008* (2013.01); *E04D 13/17* (2013.01)

(58) Field of Classification Search
USPC .................................. 411/383, 395; 137/197
See application file for complete search history.

(56) References Cited

U.S. PATENT DOCUMENTS

| 1,014,229 | A | * | 1/1912 | Kelsey | 137/197 |
|---|---|---|---|---|---|
| 2,292,102 | A | * | 8/1942 | Cluett | 174/153 G |
| 3,326,230 | A | * | 6/1967 | Ulrich | 137/199 |
| 4,071,040 | A | * | 1/1978 | Moriarty | 137/199 |
| 4,757,654 | A | * | 7/1988 | Korhonen et al. | 52/199 |
| 4,820,097 | A | * | 4/1989 | Maeda et al. | 165/168 |
| 5,080,542 | A | * | 1/1992 | Sheahan | 411/34 |
| 5,094,049 | A | * | 3/1992 | Sells | 52/199 |
| 6,843,629 | B2 | * | 1/2005 | Farral et al. | 411/178 |
| 8,820,013 | B2 | * | 9/2014 | Fennell | 52/302.7 |

* cited by examiner

*Primary Examiner* — Flemming Saether
(74) *Attorney, Agent, or Firm* — Chun-Ming Shih; HDLS IPR Services

(57) ABSTRACT

A waterproof, dustproof, breathing bolt includes a bolt body having a hollow shank with a breathing chamber and a cap member fixedly located at the top side of the hollow shank and defining therein an air passage in communication with the breathing chamber and one or a number of openings in communication between the air passage and the surroundings, and a waterproof breathing member made out of a metal material by powder metallurgy and set in between the breathing chamber and the air passage and having micro pores therein of size larger than air molecules but smaller than water molecules. Thus, the waterproof breathing member allows discharge of hot air out of the apparatus in which the waterproof, dustproof, breathing bolt is installed, but prohibits external water from entering the apparatus.

9 Claims, 4 Drawing Sheets

WATERPROOF, DUSTPROOF, BREATHING BOLT

BACKGROUND OF THE INVENTION

1. Field of the Invention

The present invention relates to fastening bolts and more particularly, to a waterproof, dustproof, breathing bolt for installation in an apparatus for allowing air circulation between the inside space of the apparatus and the atmosphere but prohibiting external water from penetrating into the inside of the apparatus.

2. Description of the Related Art

Following fast development of the modern technology, many different kinds of machines, equipments, electronic products, power supply equipments or signboards have been created for outdoor applications, or for use in a place where it may get in contact with water. However, if water enters an apparatus, either electronic or mechanical, and wets the internal components, it may cause short circuits, damage or corrosion. Further, when an apparatus is used outdoors, dust particles may enter the apparatus, causing short circuits, damage or corrosion. Therefore, an apparatus for use outdoors must have a waterproof design. Water seal strips, water ditches and water guards are mostly commonly used to protect the outer shell of an outdoor apparatus against outside water and dust.

The use of water seal strips, water ditches and water guards can protect the outer shell of an outdoor apparatus against outside water and dust, but, they also prohibit internal hot air from flowing out of the outdoor apparatus into the atmosphere during the operation of the outdoor apparatus. Accumulated waste heat in the outdoor apparatus can cause the outer shell of the outdoor apparatus to expand, resulting in formation of crevices in the outer shell, through which outside dust particles or water molecules can pass into the inside of the outdoor apparatus, causing damage.

Therefore, it is desirable to provide a measure that prohibits dust particles and water molecules from passing into the inside of an outdoor apparatus but allows air circulation between the inside space of the outdoor apparatus and the atmosphere.

SUMMARY OF THE INVENTION

The present invention has been accomplished under the circumstances in view. It is therefore the main object of the present invention to provide a waterproof, dustproof, breathing bolt, which allows air circulation between the atmosphere and the inside space of the apparatus in which the waterproof, dustproof, breathing bolt is installed but prohibits external water from penetrating into the inside of the apparatus.

To achieve this and other objects of the present invention, a waterproof, dustproof, breathing bolt in accordance with the present invention comprises a bolt body and a waterproof breathing member. The bolt body comprises a hollow shank defining a breathing chamber therein, and a cap member fixedly mounted at the top side of the hollow shank and defining therein an air passage in communication with the breathing chamber and one or a number of openings in communication between the air passage and the atmosphere. The waterproof breathing member is set in between the breathing chamber and the air passage, having micro pores therein of size larger than air molecules but smaller than water molecules. Thus, the waterproof breathing member allows discharge of hot air out of the apparatus in which the waterproof, dustproof, breathing bolt is installed but prohibits external water from entering the apparatus.

Further, the bolt body can be directly molded on the waterproof breathing member by insert molding, eliminating further processing process, simplifying the manufacturing process and facilitating installation.

Further, a water seal cushion can be mounted around the hollow shank of the bolt body and squeezed between the flat head of the hollow shank of the bolt body and the apparatus in which the waterproof, dustproof, breathing bolt is installed to prohibit outside water from penetrating through any gap between the hollow shank and the apparatus, achieving accurate water sealing effects.

DETAILED DESCRIPTION OF THE PREFERRED EMBODIMENT

Figure 1:
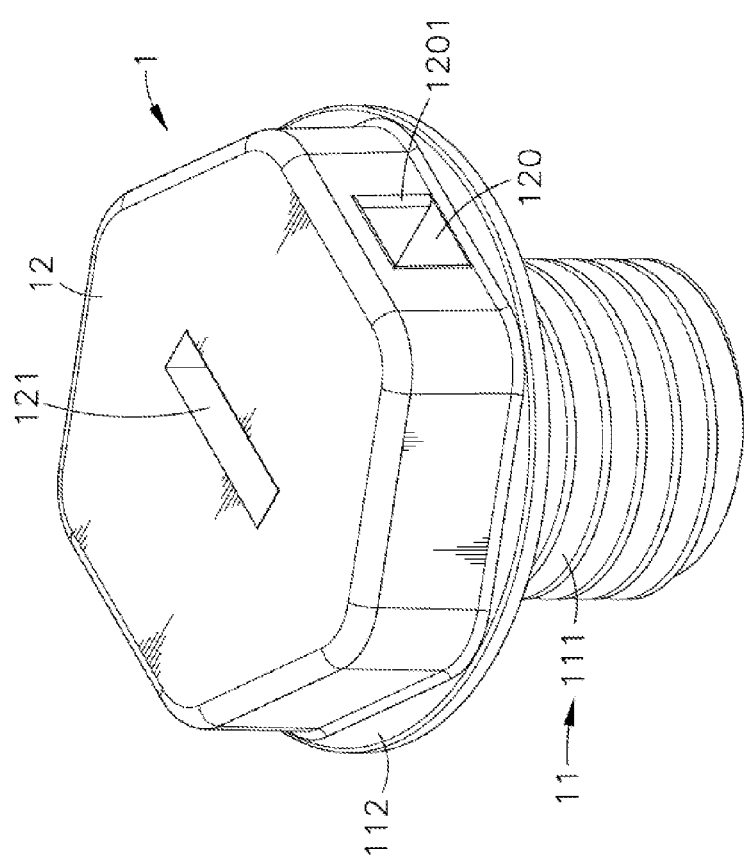
FIG. 1 is a top elevational view of a waterproof, dustproof, breathing bolt in accordance with the present invention.
Figure 2:
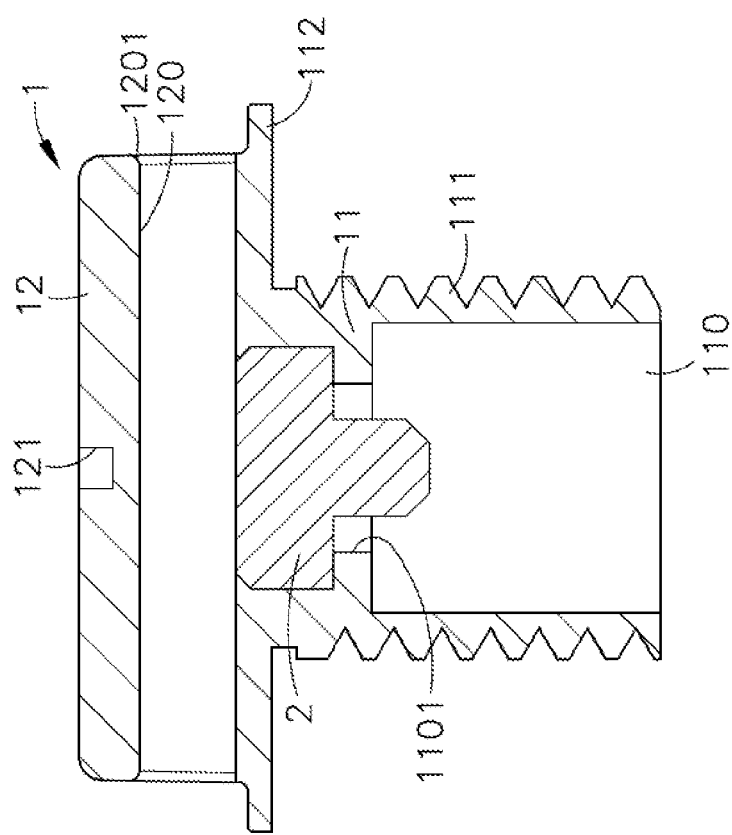
FIG. 2 is a sectional side view of the waterproof, dustproof, breathing bolt in accordance with the present invention.
Figure 3:
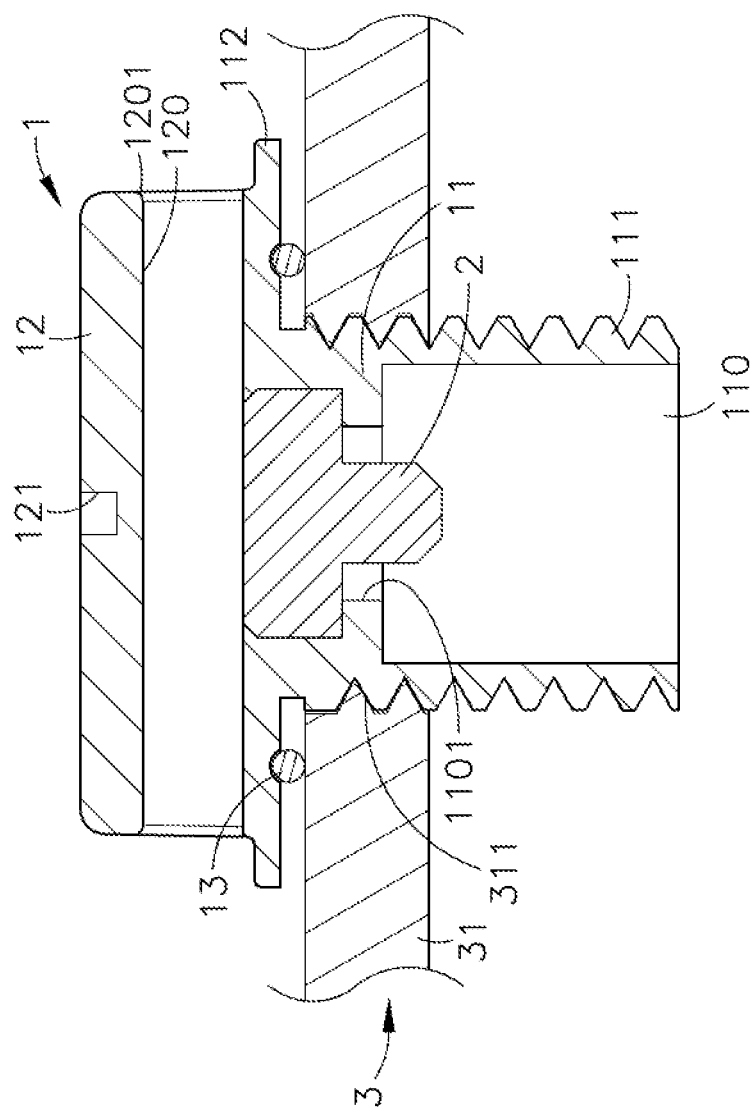
FIG. 3 is a schematic sectional applied view of the waterproof, dustproof, breathing bolt in accordance with the present invention.

Referring to FIGS. 1-3, a waterproof, dustproof, breathing bolt in accordance with the present invention is shown. The waterproof, dustproof, breathing bolt comprises a bolt body 1 and a waterproof breathing member 2.

The bolt body 1 comprises a hollow shank 11 and a cap member 12. The hollow shank 11 comprises a breathing chamber 110 that extends downwardly to the bottom side of the hollow shank 11, and anchoring means 111 that is formed integral with the periphery of the hollow shank 11. The cap member 12 defines therein an air passage 120, and at least one opening 1201 in communication between the air passage 120 and the surroundings.

The waterproof breathing member 2 is made out of a metal material, for example, iron, stainless steel or copper by powder metallurgy, having micro pores (not shown) therein of size larger than air molecules but smaller than water molecules. The waterproof breathing member 2 is mounted in between the breathing chamber 110 of the hollow shank 11 and the air passage 120 of the cap member 12, having at least two sides thereof exposed to the breathing chamber 110 and the air passage 120.

Further, the cap member 12 can be made hexagonal, rectangular, circular, or any other shape. Further, the cap member 12 can be made having a tool groove 121 located at the top wall thereof for allocation of a hand tool being used to seize or drive the waterproof, dustproof, breathing bolt. Further, the tool groove 121 can be a keystone groove, crossed groove, star-shaped groove, pentagonal groove, polygonal groove, or any other particularly shaped groove.

Further, the air passage 120 is disposed on the middle of the cap member 12 and extended to at least one of the multiple peripheral walls of the cap member 12, forming at least one opening 1201 in the peripheral walls of the cap member 12. Further, the air passage 120 can be keystone-shaped passage, cross-shaped passage, star-shaped passage, L-shaped passage, V-shaped passage, K-shaped passage, or any other particularly shaped passage.

Referring to FIGS. 1-3 again, during an application of the present invention, insert one end of the hollow shank 11 of the bolt body 1 into a through hole 311 at the outer shell 31 of a predetermined apparatus 3 (machine, equipment, electronic product, power supply equipment, signboard, etc.) to let the anchoring means 111 be fixedly secured to the through hole 311 and the cap member 12 be caped on the outer surface of the outer shell 31. At this time, external water that goes through the at least one opening 1201 into the air passage 120 will touch the waterproof breathing member 2. Because the micro pores in the waterproof breathing member 2 have a size larger than air molecules but smaller than water molecules, the waterproof breathing member 2 will stop external water from entering the breathing chamber 110 of the hollow shank 11, and therefore external water cannot penetrate through the waterproof, dustproof, breathing bolt into the inside of the predetermined apparatus 3, avoiding apparatus damage. Thus, the predetermined apparatus 3 can be used outdoor or in any environment exposed to water. In other words, the invention broadens the applicability of the predetermined apparatus 3 and prolongs its lifespan.

Further, the predetermined apparatus 3 will release waste heat during its operation. At this time, hot air in the predetermined apparatus 3 can go through the breathing chamber 110 of the hollow shank 11 and the micro pores in the waterproof breathing member 2 into the air passage 120 of the cap member 12 and then into the surroundings via the at least one opening 1201 of the cap member 12. Further, outside cold air can go reversely through the aforesaid channel into the inside of the predetermined apparatus 3 to lower the internal temperature of the predetermined apparatus 3. Subject to the aforesaid air circulation process, the air pressure inside the predetermined apparatus 3 can be balanced with atmospheric pressure, preventing deformation and breathing of the outer shell 31 of the predetermined apparatus 3, maintaining the waterproof functions, and prolonging the lifespan of the predetermined apparatus 3.

Further, in this embodiment, the anchoring means 111 of the hollow shank 11 of the bolt body 1 is an outer thread. However, this is not a limitation. Alternatively, the anchoring means 111 can be latch means, retaining block means or retaining groove means for engagement with relative mating means in the through hole 311 of the outer shell 31 of the predetermined apparatus 3. Further, a welding technique or an external fastening means can be used to fixedly secure the hollow shank 11 of the bolt body 1 to the through hole 311 of the outer shell 31 of the predetermined apparatus 3.

Figure 4:
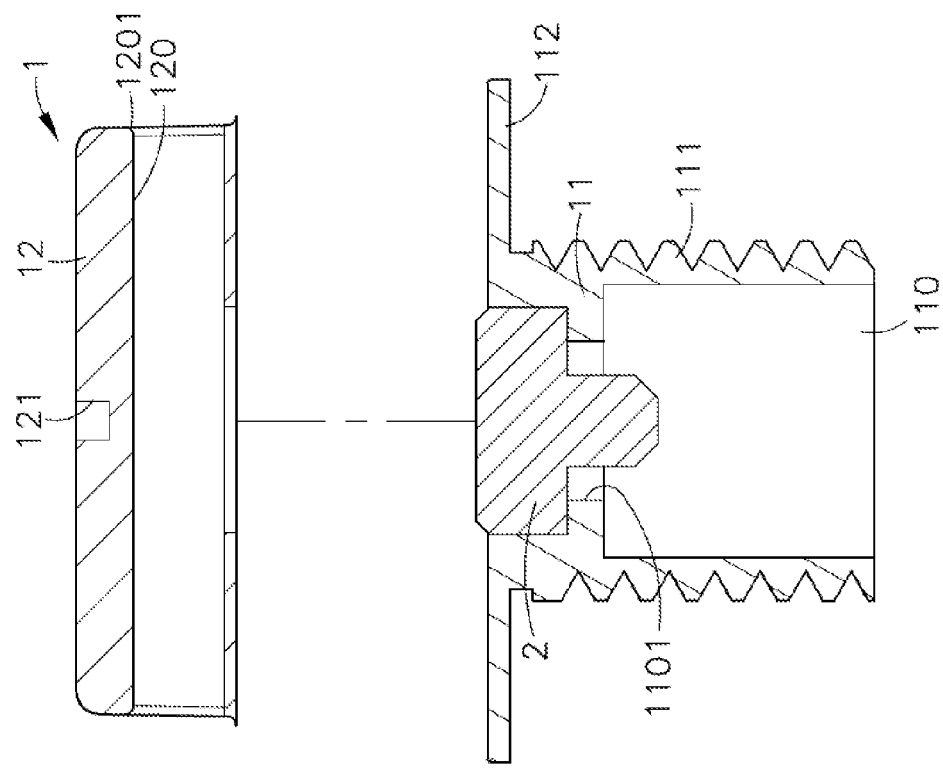
FIG. 4 is a sectional exploded view of the waterproof, dustproof, breathing bolt in accordance with the present invention.

Referring to FIG. 4 and FIGS. 1-3 again, the hollow shank 11 of the bolt body 1 further comprises a flat head 112, and a breathing passage 1101 vertically cut through the flat head 112 in communication with the breathing chamber 110 for accommodating the waterproof breathing member 2 and supporting the cap member 12. Further, the hollow shank 11 and the cap member 12 can be made in integrity. Alternatively, the hollow shank 11 and the cap member 12 can be separately made and then fastened together by latching, adhesive bonding, welding, snap joint, or any other fastening means. Further, the bolt body 1 can be made out of a plastic material and directly molded on the waterproof breathing member 2 by insert molding. Alternatively, the waterproof breathing member 2 can be accommodated in the breathing passage 1101 of the hollow shank 11 after the hollow shank 11 is made out of a plastic material, and then fixedly secured thereto using heat sealing or ultrasonic sealing technology, or by interference fit. For the benefits of quick fabrication and cost savings, the bolt body 1 is directly molded on the waterproof breathing member 2 by insert molding in the present preferred embodiment.

Further, the breathing chamber 110 and breathing passage 1101 of the hollow shank 11 after the hollow shank 11 can be made circular, rectangular, hexagonal, or any other shape, allowing pass therethrough. Further, the waterproof breathing member 2 can be made in any form capable of letting air pass through the breathing chamber 110 and the air passage 120 and prohibiting water penetration between the breathing chamber 110 and the air passage 120.

Referring to FIGS. 1-3 again, during application of the present invention, a water seal cushion 13 is mounted around the hollow shank 11 of the bolt body 1 and squeezed between the flat head 112 the hollow shank 11 of the bolt body 1 and the predetermined apparatus 3 to prohibit outside water from passing through any gap between the hollow shank 11 and the predetermined apparatus 3, achieving accurate water sealing effects.

In actual application of the present invention, the waterproof, dustproof, breathing bolt has the following features and advantages:

1. The waterproof breathing member 2 being set between the breathing chamber 110 of the hollow shank 11 of the bolt body 1 and the air passage 120 of the cap member 12 is made out of a metal material by powder metallurgy, having micro pores therein of size larger than air molecules but smaller than water molecules; therefore the waterproof breathing member 2 allows discharge of hot air out of the predetermined apparatus 3 into the surroundings through the breathing chamber 110 of the hollow shank 11 of the bolt body 1 and the air passage 120 of the cap member 12 but prohibits external dust particles and water molecules from passing through the air passage 120 of the cap member 12 and the breathing chamber 110 of the hollow shank 11 of the bolt body 1 into the inside of the predetermined apparatus 3.
2. The bolt body 1 is directly molded on the waterproof breathing member 2, eliminating further processing and facilitating installation.
3. A water seal cushion 13 can be mounted around the hollow shank 11 of the bolt body 1 and squeezed between the flat head 112 of the hollow shank 11 of the bolt body 1 and the predetermined apparatus 3 to prohibit outside water from passing through any gap between the hollow shank 11 and the predetermined apparatus 3, achieving accurate water sealing effects.

In conclusion, the invention provides a waterproof, dustproof, breathing bolt, which comprises a bolt body 1, which comprises a hollow shank 11 defining therein a breathing chamber 110 and a cap member 12 fixedly mounted at the top side of the hollow shank 11 and defining therein an air passage 120 in communication with the breathing chamber 110 and at least one opening 1201 in communication between the air passage 120 and the surroundings, and a waterproof breathing member 2 that is made out of a metal material by powder metallurgy and set in between the breathing chamber 110 and the air passage 120, having micro pores therein of size larger than air molecules but smaller than water molecules. Subject to the characteristic that the size of the micro pores of the waterproof breathing member 2 is larger than air molecules but smaller than water molecules, the waterproof breathing member 2 can effectively stop external water from going through the breathing chamber 110 of the hollow shank 11 into the inside of the predetermined apparatus 3, but, it allows discharge of internal hot air out of the predetermined apparatus 3 into the surroundings through the breathing chamber 110 of the hollow shank 11 and the air passage 120 and at least one opening 1201 of the cap member 12.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A waterproof, dustproof, breathing bolt, comprising:
a bolt body comprising a hollow shank and a cap member fixedly mounted at a top side of said hollow shank, said hollow shank comprising a breathing chamber downwardly extending from a bottom side thereof and anchoring means located at the periphery thereof for mounting, said cap member defining therein an air passage in communication with said breathing chamber and at least one opening in communication between said air passage and the surroundings; and
a waterproof breathing member made out of a metal material by powder metallurgy and set in between said breathing chamber and said air passage, said waterproof breathing member comprising a plurality of micro pores of size larger than air molecules but smaller than water molecules, wherein said waterproof breathing member has a base portion and an extension portion protruded from the base portion;
wherein said hollow shank further includes a breathing passage in communication between said breathing chamber and said air passage and adapted for accommodating said waterproof breathing member, and said base portion is located in said breathing chamber and a part of said extension portion protrudes out of said breathing passage to be located in the said breathing chamber.

2. The waterproof, dustproof, breathing bolt as claimed in claim 1, wherein said cap member comprises a tool groove located at a top wall thereof.

3. The waterproof, dustproof, breathing bolt as claimed in claim 1, wherein said anchoring means of said hollow shank is an outer thread, and said outer thread is arrangement on an outer surface of said hollow shank.

4. The waterproof, dustproof, breathing bolt as claimed in claim 1, wherein said hollow shank further comprises a flat head located at the top side thereof and adapted to support said cap member, and said breathing passage extending through said flat head further comprises a containing chamber adjacent to said air passage and adapted for accommodating said base portion.

5. The waterproof, dustproof, breathing bolt as claimed in claim 4, wherein said air passage are selectively configured in a rectangular shape.

6. The waterproof, dustproof, breathing bolt as claimed in claim 4, further comprising a water seal cushion mounted around said hollow shank and stoppable between said flat head of said hollow shank and an external apparatus in which the waterproof, dustproof, breathing bolt is installed.

7. The waterproof, dustproof, breathing bolt as claimed in claim 4, wherein said base portion, which is fitted into said containing chamber, includes a base surface with a cut-out edge, and the base surface and a bottom surface of said air passage form a flat plane.

8. The waterproof, dustproof, breathing bolt as claimed in claim 1, wherein said waterproof breathing member is selected from the material group of iron, stainless steel and copper.

9. The waterproof, dustproof, breathing bolt as claimed in claim 1, wherein said bolt body is made out of a plastic material.

* * * * *